Patented Sept. 3, 1929.

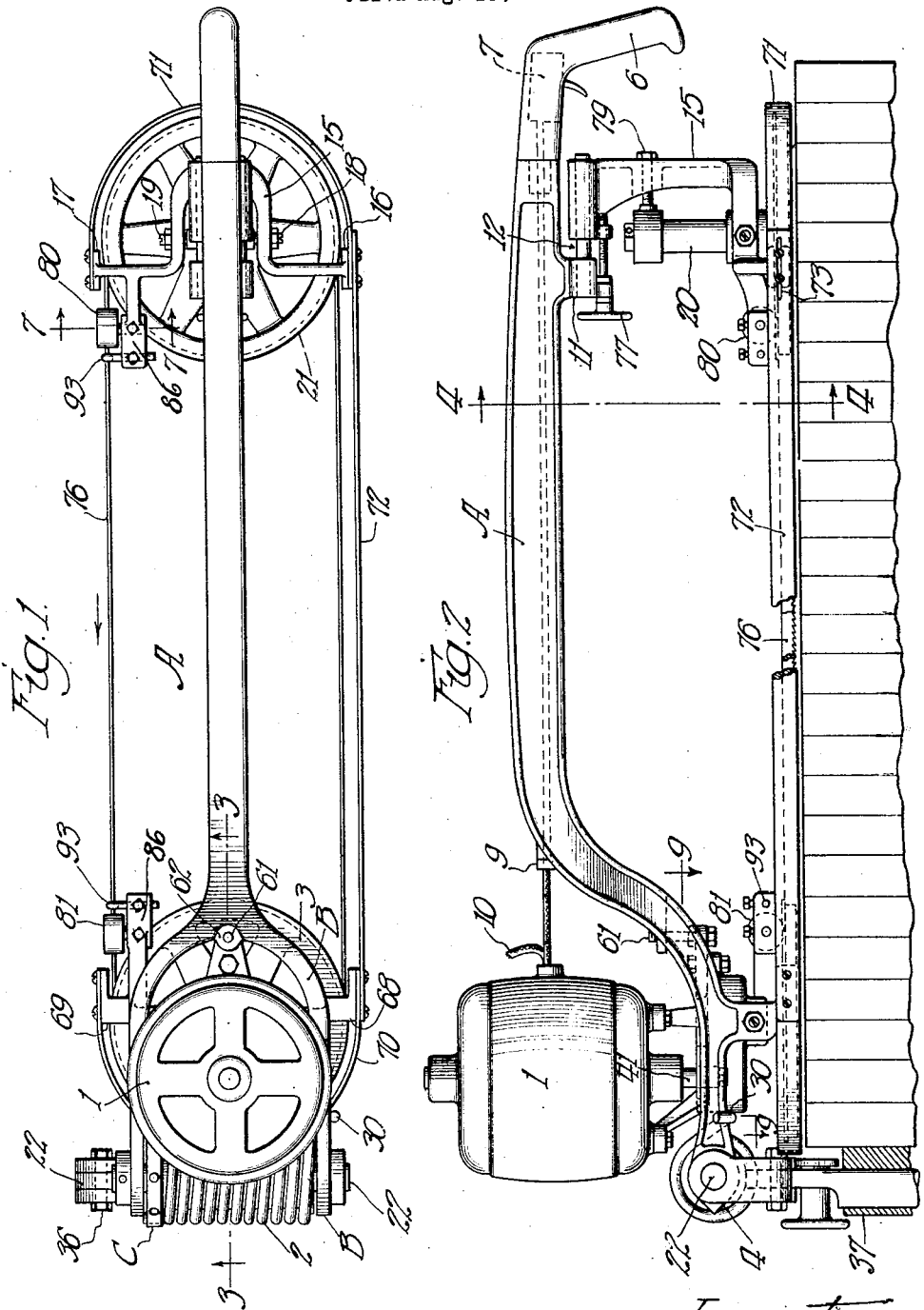

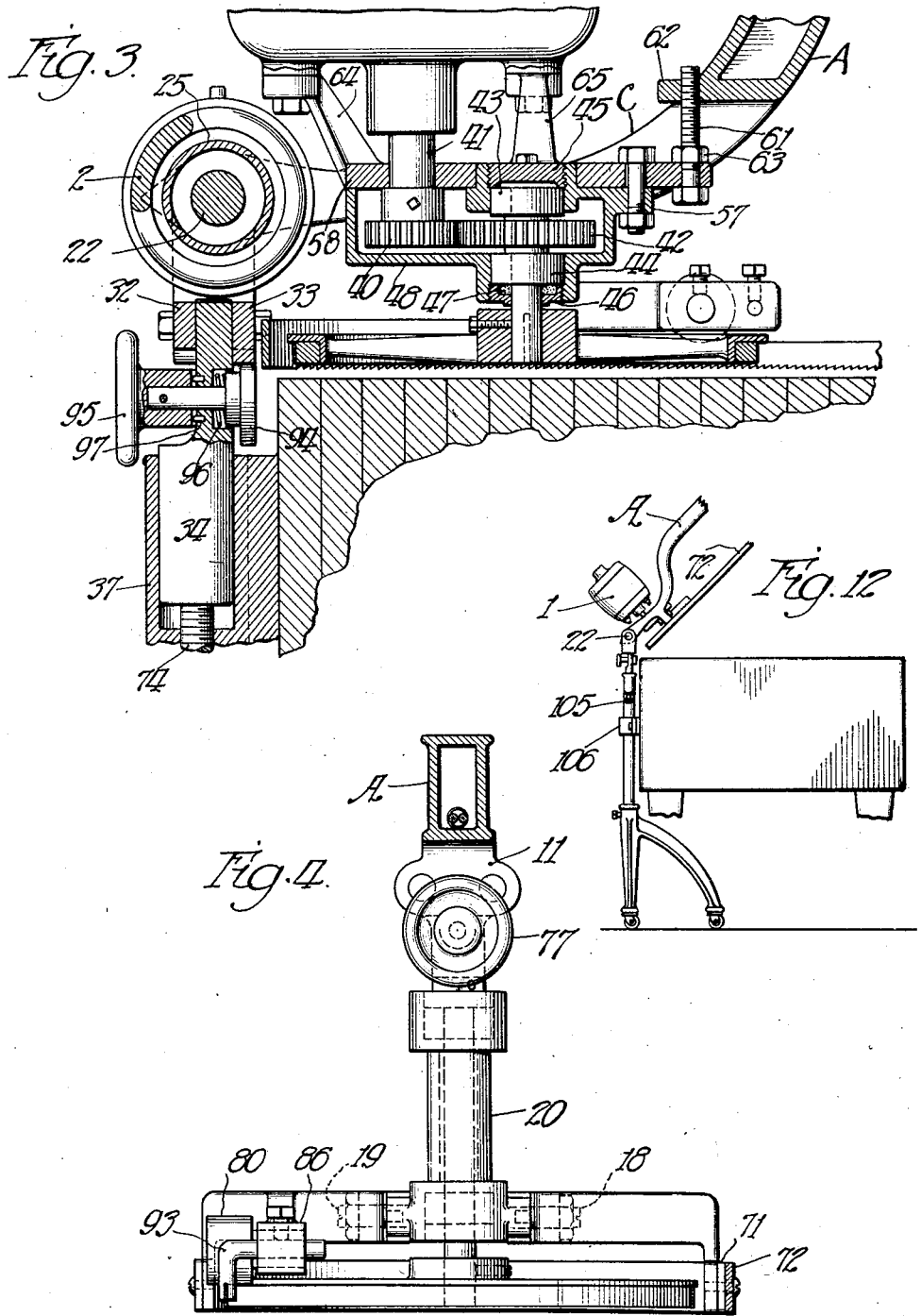

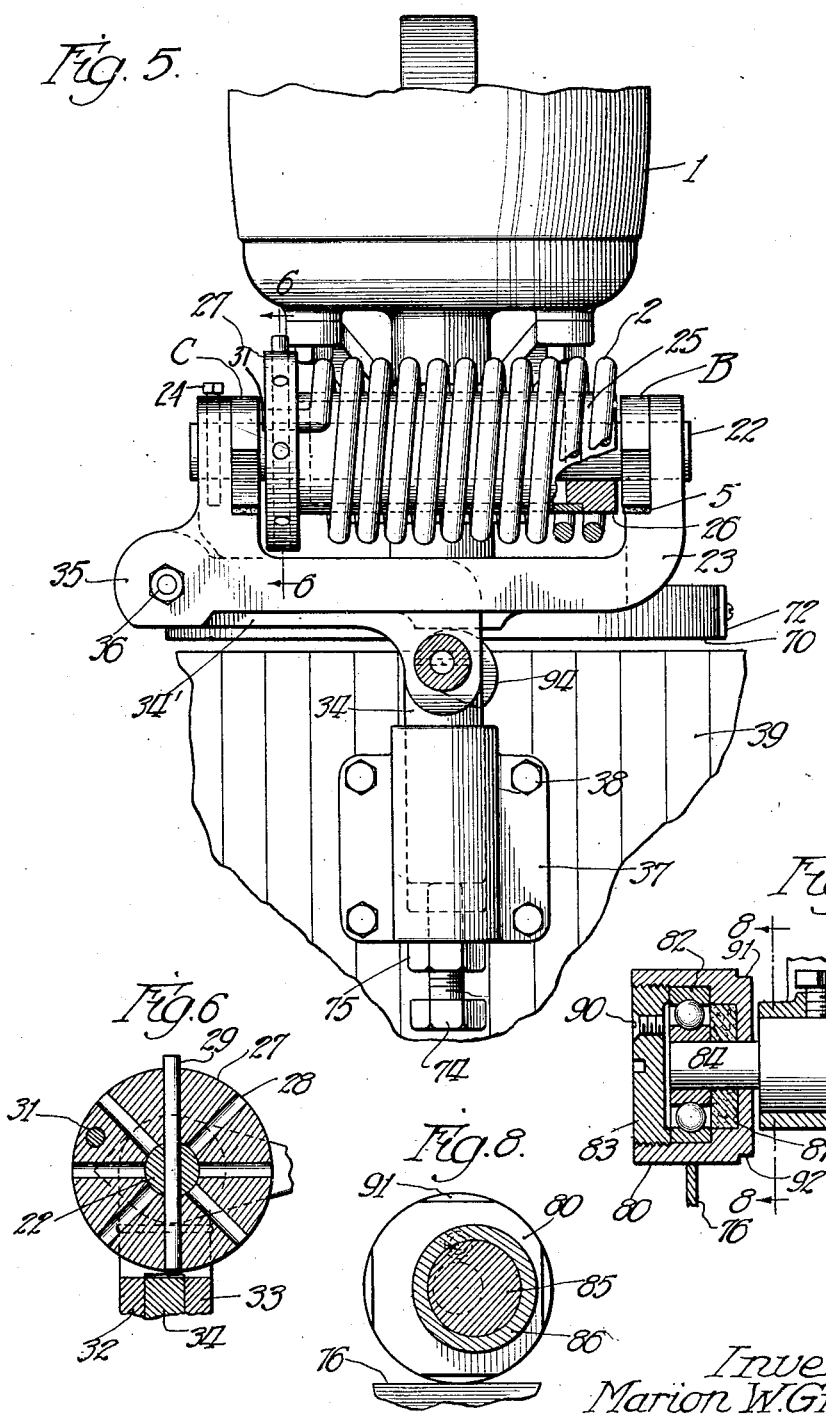

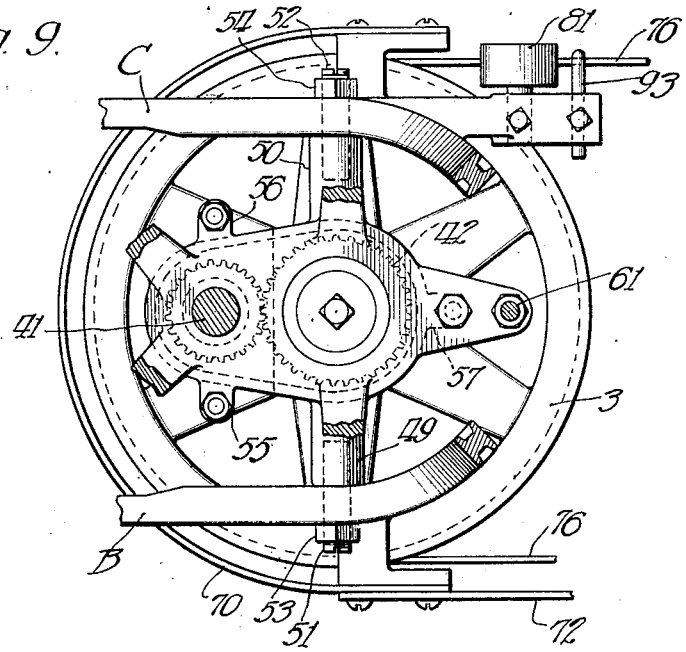
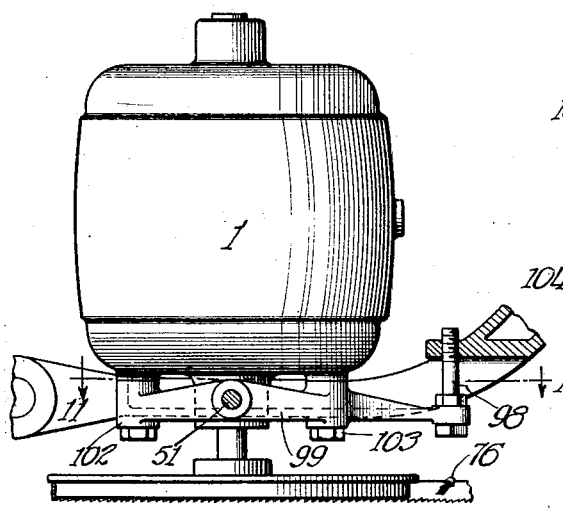
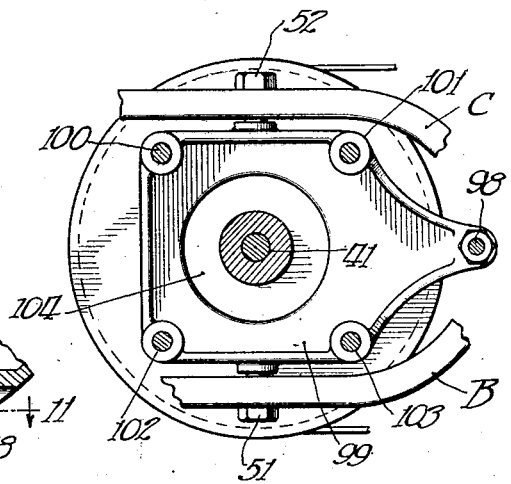

1,726,893

UNITED STATES PATENT OFFICE.

MARION W. GRIGSBY, OF CHICAGO, ILLINOIS, ASSIGNOR TO DE WITT C. BECKER, TRUSTEE.

POWER MEAT AND BONE SAW.

Application filed August 18, 1925. Serial No. 50,919.

My invention relates to power meat and bone saws, and more particularly to machines of this character ordinarily employed in butcher shops for use at the meat block.

One of the objects of my invention is to provide an improved and simplified practical machine of the above character which is more compact and rigid in construction, simple in arrangement and operation and with various forms of adjustment including means for disposing the saw so as to cut down through the meat at an angle to the vertical instead of a simple vertical cut as heretofore.

Another feature of my invention is the arrangement and correlation of the parts at the motor and supporting end so as to provide a more compact arrangement and lessen the weight of the machine, while at the same time providing a construction which ordinarily tilts the machine upwardly away from the block when the handle is released.

There are other features and advantages, and these will be more particularly pointed out in the ensuing part of the specification and appended claims.

For a better understanding of my invention reference is to be had to the accompanying drawings, in which—

Fig. 1 is a plan view of the preferred form of machine in which the saw pulley is geared to the motor shaft;

Fig. 2 is an elevation of the machine, looking at the front or non-cutting side of Fig. 1;

Fig. 3 is an enlarged vertical section of a portion of the machine along center line below the motor, looking toward the machine from non-cutting side, along the line 3—3 of Fig. 1;

Fig. 4 is a vertical section through the frame at a point between the two pulley wheels on line 4—4 of Fig. 2, looking toward the handle end;

Fig. 5 is a rear end elevation showing machine as viewed from the supported end;

Fig. 6 is a vertical section through the spring tension adjusting washer along line 6—6 of Fig. 5;

Fig. 7 is a vertical section through the saw blade roller and support along line 7—7 of Fig. 1;

Fig. 8 is a cross-sectional view along the line 8—8 of Fig. 7, showing the eccentric mounting for saw roller 80;

Fig. 9 is a horizontal section of motor end of machine, at a point just above gear case cover along line 9—9 of Fig. 2;

Fig. 10 is an elevation, viewed from the non-cutting side of the machine, and shows a modified form wherein the saw pulley wheel is fastened directly to the armature shaft of the motor;

Fig. 11 is a horizontal section of motor end of machine of Fig. 10 at a point just below motor; and Fig. 12 shows the machine mounted on a tripod fitted with castors to enable the machine to be moved from one butcher block to another, and a clamp for fastening the tripod to the block.

Referring now more in detail to the preferred form of my invention, I preferably use a hollow ribbed or flanged frame A which divides near the motor end into a fork having arms B and C, the shape of said frame being shown in Fig. 1 and Fig. 2, and of the arms B and C, as shown in Fig. 9. A reason for the forking of the frame A is that it allows the motor 1 to be placed nearly over the drive pulley wheel 3, as in Fig. 2, or directly over drive wheel as in the modified form Fig. 10 close to the pivotal support of the frame and it allows the insertion of a torsion spring 2, between the ends of the fork arms B and C. This spring is powerful enough to raise the saw to sufficiently clear the block, which is to an angle of approximately 45 degrees, flat portions 4 of the fork arms striking the rubber bumper blocks 5, (Fig. 5) to act as stops. The forwardly extending portion of the frame A is preferably hollow (Fig. 4) and narrows down at the end farthest from the forks to a cylindrical shape.

A pistol grip is inserted into the end of frame A as shown in Fig. 2. This pistol grip is cored out so as to permit the insertion of a suitable quick make and break contact switch 7, which has a trigger 8, such a switch being shown in copending application Serial Number 758,351. An electric conductor for connecting the switch with the motor runs from the switch through the hollow of frame A, to a plug 9, Fig. 2. Wire 10 connects with the source of power in the butcher shop and is so connected with plug 9 as to put the switch 7 in circuit so that the switch is operated to start and stop the motor.

The front pulley support 15 is slidingly held on two rods 12 screwed in lug 11 and extends downwardly and then horizontally forming a U-shape, then outwardly and downwardly with lugs 16 and 17 at each end. The axle housing 20 is tiltably supported in the arms of support 15 by pivot screws 18, 19. The axle housing 20 contains an axle fitting tightly at upper and lower ends in ball bearings, the lower portion of said axle being fitted by keyway and set screw to the hub of saw pulley wheel 21. The outer race of the ball bearings is held firmly to the housing at both ends of the axle housing 20 by caps which screw down firmly against the said outer race of the ball bearings.

A hand wheel 77 is provided for adjusting the frame 15 on the rods 12 so as to permit applying the saw 76 to the pulleys and tighten it. The pulley 21 may be tilted on the pivots 18—19 by adjusting screw 79 so as to more positively hold the band saw on the wheel.

Now as to the pivotal supporting means for the rear end of the saw frame A; connecting the two arms B and C is a shaft 22, supported at its ends by a yoke 23, Fig. 5, and firmly fastened at one end by the screw 24. Around the rod 22 is a hollow tube 25, one end of which is held in place by a collar 26, the other end of which is held in place by a spring adjusting collar 27. A vertical section of this collar 27 is shown in Fig. 6. It contains tapered holes such as 28, and a tapered pin 29 is shown in one of these holes extending on through the shaft 22.

In order to raise the machine clear of the block when not in use suitable elevating means as a counter weight or spring may be employed, but I preferably use a torsion spring 2. This is supported by the hollow tube 25 and one end 30 (Fig. 1) of this spring is bent and held beneath the arm B of frame A and the other end 31, Figs. 5 and 6, runs into a hole in collar 27. The tension of the spring may be varied by taking out pin 29 and turning the collar 27 and then inserting pin 29 into the proper hole and through hole in shaft 22.

The bottom or horizontal portion of the yoke 23 is slotted to form two sides 32 and 33, Fig. 3, between which a horizontal arm 34' carried by swivel plug 34 is inserted. Vertical adjustment of the plug 34, and thereby the saw blade, is made by screw 74 which is held by lock nut 75. Arm 34' pivotally supports yoke 23 by a bolt 36 which passes through end 35 enabling the yoke 23 to be tilted on its pivot to vary the angular cut of the saw. This pivot point 36 is preferably so related to the cutting edge of the saw that when the frame 23 and the saw are tilted, the cutting edge of the saw practically maintains its distance from the face of the cutting block so that it is not essential that the vertical adjustment of the frame and saw by screw 74 be made when the angular adjustment is made.

To tilt the yoke and saw I provide a cam 94 adapted to be rotated by the hand wheel 95. The vertical portion of the swivel plug fits revolvably tight into a block bracket 37, which is securely fastened by lag screws 38 to the side of the butcher clock 39. Thus the saw may be swung around on the meat block to any portion.

In order to reduce the load to be raised by the spring 2, it is desirable to have the motor, which is the heaviest portion of machine, as near the pivot point as possible. Therefore, I set the motor back of the saw pulley shaft by using a gear 40 (of a non-metallic composition) fastened to the shaft 41 of the motor (see Fig. 3) and meshing with a metallic gear 42 butting against the inner race of ball bearings 43 and 44. The outer race of the ball bearings is held tightly by caps 45 and 46 which are screwed to position, the lower cap 46 being hollowed to contain an oil retaining felt washer 47. (Caps similar to caps 45 and 46 are in axle housing 20.) The axle is keyed to gear 42 and to hub of wheel 3.

In order to enclose the gears, hold same in position, and to grease same and at the same time keep dirt out, a gear case 48 is used, which also carries the saw driving pulley and is pivotally supported by frame A through two horizontal projections 49 and 50, Fig. 9, connected by pivot screws 51 and 52, to arms B and C respectively of frame A. The gear case also has three other projections 55, 56 and 57, to enable the gear case cover 58 to be fastened to it. A bolt 61 (Fig. 3) is tapped into a projecting portion 62 of frame A for tiltably adjusting the gear frame and rear saw pulley on the pivot screws 51—52. A nut 63 serves to lock bolt in position. The gear case cover 58 also has four upward extending legs, such as 64 and 65, to support the motor. The four rods which hold the motor together pass through these legs, thus securely fastening the motor to the legs of the gear case cover by nuts.

The fork arms B and C of frame A have projections 68 and 69, Fig. 1, respectively, which extend downward and outward, to which one of the curved portions 70 of the saw guard are fastened by screws. A similar curved portion 71 of the saw guard is fastened by screws to the flat portions 16 and 17 of the axle housing support 15. There is a straight portion 72 of the saw guard which is fastened to arm 68 by the same screws that hold 70 in place. The other end of straight portion 72 of the saw guard has a slot 73 so that it may slide horizontally on the shoulder screws.

In installing, the machine is placed on the butcher block and the swivel plug 34 is placed into the block bracket 37 and the latter firmly fastened to the meat block with lag screws, said bracket being so placed that its vertical center line will be about 5 inches inwardly from the left hand corner farthest from the operator of the machine. Then the bolt 74, Fig. 5, is screwed up against the bottom of swivel plug so that the saw will barely clear the block, and the nut 75 is tightened.

The motor to which the gear case cover 58 has already been fastened, together with the gear 40 on the motor shaft is next set in place, so that gear 40 meshes with gear 42 and the gear case cover is firmly secured to gear case 48.

The saw blade 76 is next put on by turning hand wheel 77 so as to draw frame 15 toward the motor, the slot 73 in the straight portion 72 of the saw guard allowing this adjustment. Saw blade 76 can now be put on, the face of the saw blade lying against a canvas phenolic resin ring 78, securely fastened to wheel. The teeth of the saw blade point toward the motor on the cutting side of the machine and blade runs in direction indicated by arrow, Fig. 1. Hand wheel 77 is now turned in the opposite direction so as to force axle housing support and idler wheel away from motor to tighten the saw blade 76.

It has been found that if the pulley wheels 21 and 3 run exactly in a horizontal plane when machine rests on the block, that the saw blade will come off rather easily. But by tilting the pulley wheels as already described, so as to raise the edge of wheels on side furthest from center of machine the saw blade will climb up on pulley wheels. The tension of the saw blade also helps hold the blade on the pulley wheels.

Now to prevent the saw blade from being pushed upward when sawing, it is desirable to provide rollers on the cutting side against which the back, or upper edge, of saw blade can run. This is done by providing rollers 80 and 81, Fig. 1. The construction of these is shown in vertical section in Fig. 7, wherein 80 is the roller, the horizontal face of which in case hardened so that the back of the saw blade 76 will not cut into it when machine is in motion. Inside the roller is a ball bearing race 82, firmly pressed down by the screw cap 83, so as to firmly bind cap, roller and outer race of bearing, so that all will run as a unit. The inner race of ball bearing is a drive fit onto the small cylindrical portion 84 of the eccentric axle, while the larger cylindrical portion 85 of axle fits snugly into a projecting arm 86 of the axle housing support. A felt washer 87 serves merely as a grease retainer. The axle may be turned by applying a screw driver in slot 88, thus causing the roller to be raised or lowered to the required point, and the set screw 89 tightened to prevent slippage. In greasing ball bearing of roller, screw 90 can be removed rather than the cap 83. The roller is filed flat on two sides 91 and 92, so that it can be gripped with a wrench when tightening the cap 83.

In order to give lateral support to the saw blades, arms as 93 are provided. These arms can be moved sidewise so that slots in them will be in the proper line for saw blades to pass through. The ends of these slotted arms can be rotated upward or downward, so as to clear the saw teeth.

In operation, the butcher preferably cuts the flesh down to the bone with his knife as usual. Then he simply grips the handle 6 of the machine and as he pushes downward on same, pulls the trigger 8 so that before the saw blade gets to the bone the saw is in full motion. The instant the trigger is released the current is automatically cut off and the saw stops. The machine is free to swing sideways also as the swivel plug 34 is free to move in the block bracket 37.

There are some butchers who wish to cut meat on a slant with the vertical. To enable this to be done the entire saw frame may be tilted through the yoke 23 which is hinged to the arm 34' of the swivel plug as already referred to. To this end the cam 94 is used to raise the yoke. To turn the cam, it is first pulled outwardly by the wheel 95 against the spring 96 so as to disengage the teeth at 97. The cam is then adjusted and allowed to drop back to lock by the pins 97.

In the modifications of my invention of Figs. 10 and 11, I show the drive wheel fastened directly to the motor shaft without the use of an extra gear. This, however, throws the motor, which is the heaviest part for torsion spring 2 to lift, farther away from the pivotal point of support of the frame, and necessitates a stronger torsion on the spring. Also as there would be no decrease in speed reduction by gears, a slower speed motor would be advisable, which would be heavier and more costly. No gear case would be needed. Bolts 98 serves the same purpose as bolt 61 of my preferred design. Fig. 11 shows the plate 99 to which the motor of this modified form is fastened at the four points 100 to 103. There is a hole 104 through which the lower central portion of motor and motor shaft 41 can pass. Pivot screws hold the motor plate 99 to the forks end B and C of frame A. Projections downward from forks hold the saw guards and the saw blade roller and guide arm as before.

Fig. 12 shows the machine with its swivel plug set in the top of a bent pipe fitted into a tripod on casters. A bolt 105 serves the same purpose as bolt 74 of my preferred design. A hinged clamp 106 keeps the tripod in position against the block if desired. The tripod is very valuable in meat markets where it is desired to move the machine from block to block. Also in demonstrating the machine to a butcher who is unwilling to have any lag screws driven into the meat block, the tripod may be used and a strap may be used to strap tripod against block, or the castors may be removed to keep the tripod from rolling.

What I claim as new and desire to secure by United States Letters Patent is:

1. A motor driven band saw for meat cutting so mounted that it does not need to project substantially beyond the area of the meat block including a frame supported to swing in vertical and horizontal planes about a pivotal point at the edge of a meat block, two band saw pulley wheels and a driving motor connected to one of said wheels all carried by said frame forward of the point of pivotal support for such swinging of the frame, the motor and one of said pulley wheels being mounted on the frame near the supported end of the frame and the other wheel being mounted on the frame at the free end, a band saw extending over said pulley wheels, a hand grip at the free end of the frame for manipulating the frame to draw it downwardly in sawing, and means confined to a small area adjacent that of the meat block for normally holding the frame at an angle above the meat block.

2. A motor driven band saw for meat cutting so connected that it does not need to project substantially beyond the area of the meat block, said saw including a band saw-frame extending into a fork at its rear end, a bracket for pivotally supporting the frame by the fork arms, a shaft extending through the bracket and fork arms and a spring encircling said shaft between fork arms and secured for normally yieldingly holding the frame at an angle above the meat block and whereby it may be drawn down into cutting position but automatically restored when released, two band saw pulley wheels and a driving motor connected to one of said wheels all carried by said frame forward of said shaft a band saw extending over said pulleys and a hand-grip at the free end of the frame for drawing the saw downwardly and otherwise manipulating it during sawing.

3. A motor driven meat saw adapted to be secured to the edge of a meat block, said saw including a swivel socket secured to the side of said block, a vertical swivel member in the socket with a side extension thereon, a yoke horizontally pivoted to the extension, a cross piece on the yoke, a saw frame pivoted to the cross piece, a coil spring around the cross piece for normally holding the saw frame at an angle above the horizontal, and a cam carried by the swivel member and bearing against said yoke adapted to be turned to rotate the yoke about its horizontal pivot, to cause the saw to cut at an angle to the vertical.

4. The combination defined in claim 3 wherein all of the moving parts of the saw including the motor are mounted in advance of said pivot, whereby the block is clear all around.

In witness whereof, I hereunto subscribe my name this 14th day of July, 1925.

MARION W. GRIGSBY.